United States Patent
Lindberg

(10) Patent No.: US 9,144,918 B2
(45) Date of Patent: *Sep. 29, 2015

(54) FIELD SAWBUCK FOR CANTILEVER SUPPORT OF A FELLED TREE

(76) Inventor: Wayne Lindberg, Hastings, MN (US)

(*) Notice: Subject to any disclaimer, the term of this patent is extended or adjusted under 35 U.S.C. 154(b) by 1086 days.

This patent is subject to a terminal disclaimer.

(21) Appl. No.: 13/136,743

(22) Filed: Aug. 9, 2011

(65) Prior Publication Data

US 2012/0049429 A1    Mar. 1, 2012

Related U.S. Application Data

(60) Provisional application No. 61/402,560, filed on Sep. 1, 2010.

(51) Int. Cl.
| B23B 3/00 | (2006.01) |
| B27B 17/00 | (2006.01) |
| B66C 1/58 | (2006.01) |
| A01G 23/00 | (2006.01) |
| B27B 21/00 | (2006.01) |

(52) U.S. Cl.
CPC .......... B27B 17/0075 (2013.01); A01G 23/003 (2013.01); B27B 21/00 (2013.01); B66C 1/58 (2013.01); B66C 1/585 (2013.01); Y10T 29/49998 (2015.01)

(58) Field of Classification Search
USPC .......................................................... 269/17
See application file for complete search history.

(56) References Cited

U.S. PATENT DOCUMENTS

| 1,464,130 | A | 8/1923 | Ferguson | |
| 1,501,652 | A | 7/1924 | Ferguson | |
| 2,566,616 | A | 9/1951 | Larson | 214/65.3 |
| 2,650,063 | A * | 8/1953 | Hawkins | 254/132 |
| 2,803,431 | A * | 8/1957 | Cooper | 254/128 |
| 2,947,514 | A * | 8/1960 | Goss | 24/270 |
| 3,116,048 | A * | 12/1963 | Irwin et al. | 254/132 |
| 3,460,594 | A * | 8/1969 | Burkhalter | 144/338 |
| 3,477,596 | A * | 11/1969 | Latendresse et al. | 414/680 |
| 3,513,998 | A * | 5/1970 | Stone | 414/734 |
| 3,620,394 | A * | 11/1971 | Symons et al. | 414/561 |

(Continued)

FOREIGN PATENT DOCUMENTS

| DE | 19911872 C2 * | 5/2001 |
| DE | 102005009253 B4 * | 7/2010 |

(Continued)

OTHER PUBLICATIONS

U.S. Patent application Publication 2004/0047717, Rogers, Mar. 11, 2004.

Primary Examiner — Lee D Wilson
Assistant Examiner — Alvin Grant
(74) Attorney, Agent, or Firm — Jacobson & Johnson LLC

(57) ABSTRACT

A field sawbuck having a tree gripper forming a top side fulcrum for holding an end of a felled tree and a tree engaging arm for pivoting the felled tree about the fulcrum to bring the felled tree to an elevated condition whereby the limbs can be removed and the tree can be conveniently cut into desired length without concern for pinching or binding the saw or having the saw blade accidentally contact a support soil for the felled tree as well a method for delivering a felled tree to a field sawbuck that can cantileverly support the felled tree during the process of removing limbs from the tree or during the process of field cutting of the felled tree into firewood lengths.

14 Claims, 7 Drawing Sheets

(56) References Cited

U.S. PATENT DOCUMENTS

| | | | | |
|---|---|---|---|---|
| 3,802,663 | A | * | 4/1974 | Widegren et al. ............ 254/132 |
| 3,841,507 | A | * | 10/1974 | Barwise ........................ 414/569 |
| 4,209,280 | A | * | 6/1980 | Bittner .......................... 414/620 |
| 4,244,560 | A | * | 1/1981 | Hawkins ....................... 254/132 |
| 4,718,816 | A | * | 1/1988 | King ............................. 414/739 |
| 4,749,012 | A | * | 6/1988 | Hamby, Jr. ................. 144/24.13 |
| 4,893,783 | A | * | 1/1990 | Diener et al. ..................... 254/1 |
| 5,061,150 | A | | 10/1991 | Rentschler ................... 414/703 |
| 5,180,142 | A | * | 1/1993 | Nowlin ......................... 254/132 |
| 5,405,238 | A | | 4/1995 | Samsel ......................... 414/703 |
| 5,516,250 | A | * | 5/1996 | Sawyer ........................... 414/23 |
| 5,564,887 | A | | 10/1996 | Brooks ......................... 414/735 |
| 6,257,818 | B1 | * | 7/2001 | Wiemeri et al. ................ 414/23 |
| 6,662,479 | B2 | * | 12/2003 | Chaney ......................... 37/301 |
| 6,921,241 | B2 | * | 7/2005 | Rogers ......................... 414/703 |
| 7,547,180 | B2 | | 6/2009 | Nye .............................. 414/703 |
| 8,561,325 | B1 | * | 10/2013 | Hegener et al. ................. 37/301 |

FOREIGN PATENT DOCUMENTS

| | | | |
|---|---|---|---|
| DE | 102009015193 A1 | * 9/2010 | |
| EP | 1852012 A1 | * 11/2007 | ............ A01G 23/00 |
| EP | 1852013 A1 | * 11/2007 | ............ A01G 23/00 |

* cited by examiner

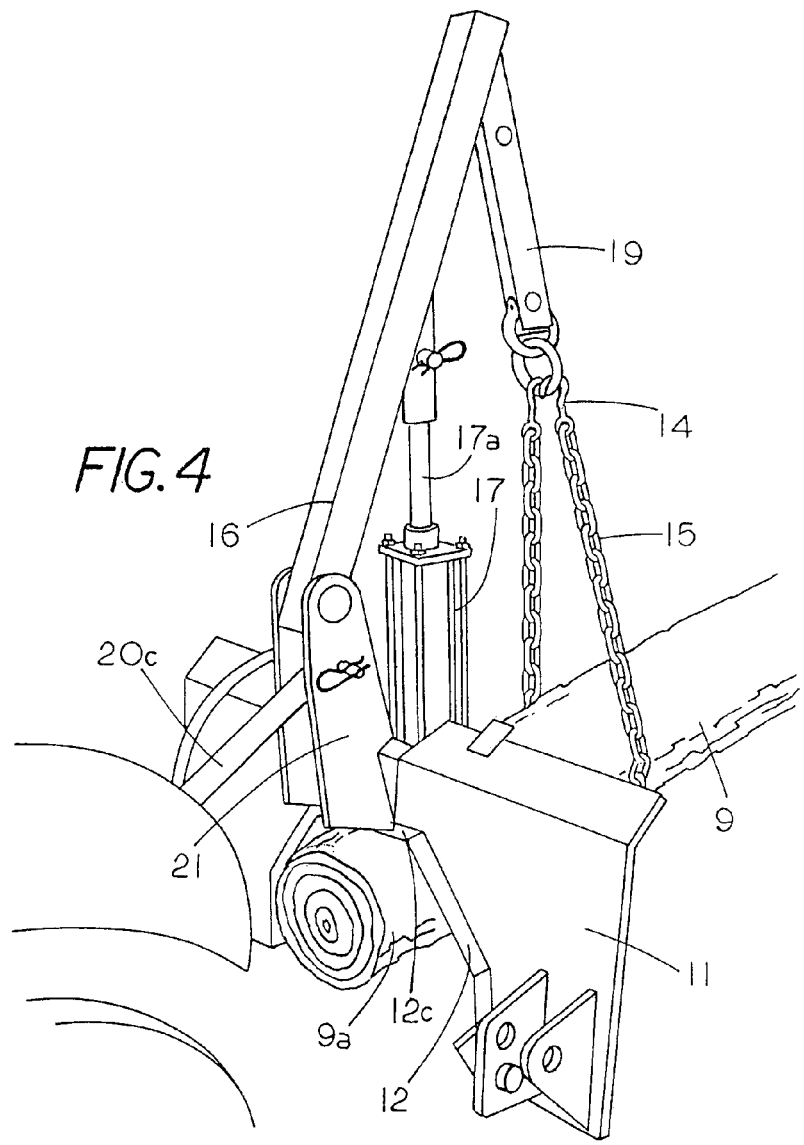
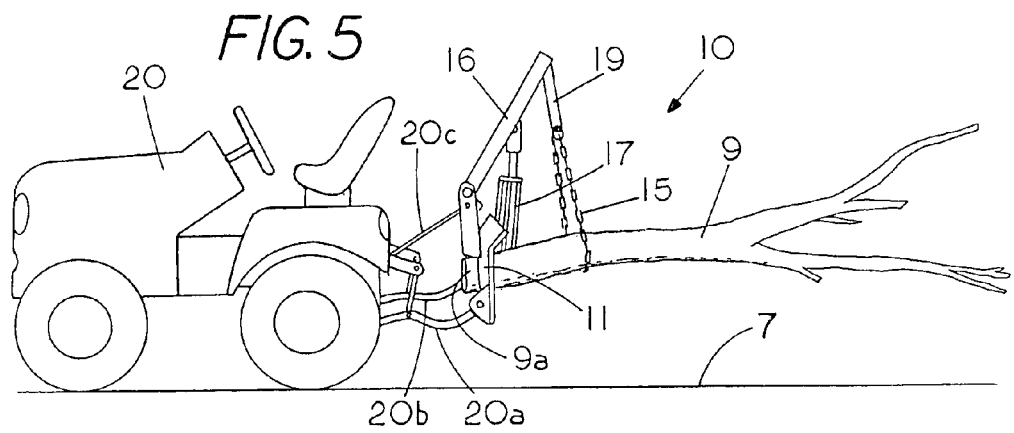

ns a field
sawbuck that can be used by an operator, such as a home-
owner, to support a felled tree in a position where the operator
can conveniently cut off the tree limbs as well as cut the tree
trunk into firewood lengths without concern for either the saw
binding or the saw accidentally contacting the soil. The inven-
tion also eliminates the need to haul a tree trunk to a sawbuck
and place the tree trunk in a sawbuck in order to cut the tree
trunk into firewood lengths.

FIELD SAWBUCK FOR CANTILEVER SUPPORT OF A FELLED TREE

CROSS REFERENCE TO RELATED APPLICATIONS

This application claims priority from provisional application titled Sawbuck Ser. No. 61/402,560 filed Sep. 1, 2010.

FIELD OF THE INVENTION

This invention relates generally to sawbucks and, more specifically, to a field sawbuck for cantileverly supporting a felled tree during trimming and cutting the felled tree into shorter lengths.

STATEMENT REGARDING FEDERALLY SPONSORED RESEARCH OR DEVELOPMENT

None

REFERENCE TO A MICROFICHE APPENDIX

None

BACKGROUND OF THE INVENTION

Commercial log processors are available for cutting and delimbing trees, however, such devices are not suitable for use by a person, such as homeowner, for cutting trees into firewood because of both the size and cost of the log processors. Consequently, a homeowner may fell a tree and then remove the limbs from the tree to form the tree trunk into a length that can more easily be transported than a felled tree. The tree trunk is generally hauled to a site where the tree trunk is cut into suitable firewood lengths. In other cases a homeowner may fell a tree and use a chainsaw to cut the felled tree into firewood lengths while the trunk of the felled tree lies on the ground.

The concept of sawbucks for holding logs while the logs are cut into firewood lengths is known in the art. The typical log sawbuck has a frame that includes a cradle for supporting the log in a cutting position to enable the log to be conveniently cut into shorter firewood lengths. The sawbuck is a useful homeowner tool in that it holds a log off the ground, which makes it easier to cut the log into shorter lengths as well as it minimizes opportunities for the operator to accidentally contact the soil with the saw blade, which may not only be hazardous but also may dull the saw blade. An additional benefit of the sawbuck is that the use of the sawbuck can eliminate pinching or binding of the saw blade during the cutting process since a log can be supported such that the portions of the log being cut do not pinch the saw blade.

However, before a log can be placed in a conventional sawbuck the tree must be felled and the limbs of the tree removed from the tree trunk. Additionally, the tree trunk may need to be cut into shorter lengths that can be placed on the sawbuck for further processing. Thus the felling of the tree and the preparation of the tree for placement in the sawbuck has the disadvantage that it is oftentimes difficult to remove the limbs of the tree when the felled tree is laying on the ground since some of the limbs may bend and pinch the blade during an on site removal of the tree limbs. In still other cases the tree limbs may lie on the ground and the operator may accidentally contact the soil with the saw blade or axe as the tree limbs are cut off. In still other cases the tree limbs may protrude at angles that makes it difficult to cut the felled tree into firewood lengths. The present invention provides a field sawbuck that can be used by an operator, such as a homeowner, to support a felled tree in a position where the operator can conveniently cut off the tree limbs as well as cut the tree trunk into firewood lengths without concern for either the saw binding or the saw accidentally contacting the soil. The invention also eliminates the need to haul a tree trunk to a sawbuck and place the tree trunk in a sawbuck in order to cut the tree trunk into firewood lengths.

SUMMARY OF THE INVENTION

A field sawbuck having a tree gripper forming a fulcrum for holding an end of a felled tree and a tree engaging arm for pivoting the felled tree about the fulcrum to bring the felled tree to an elevated condition. With the felled tree cantileverly held in an elevated condition the tree limbs can be easily removed and the felled tree can be conveniently cut into desired lengths without concern that the felled tree may pinch or bind the saw or that the saw blade may accidentally contact an object that could dull the saw blade. The invention further includes an on-site method for bringing a felled tree proximate the field sawbuck and for elevating and holding the felled tree in the field sawbuck during removal of tree limbs and during the cutting the trunk of the felled tree into useable lengths, such as firewood lengths.

BRIEF DESCRIPTION OF THE DRAWINGS

FIG. 4 shows the lawn tractor and field sawbuck of FIG. 1 with an end of a felled tree extending into a recess in the housing member of the field sawbuck;

FIG. 5 shows a felled tree cantileverly held in the field sawbuck of FIG. 1.

DESCRIPTION OF THE PREFERRED EMBODIMENT

Figure 1:
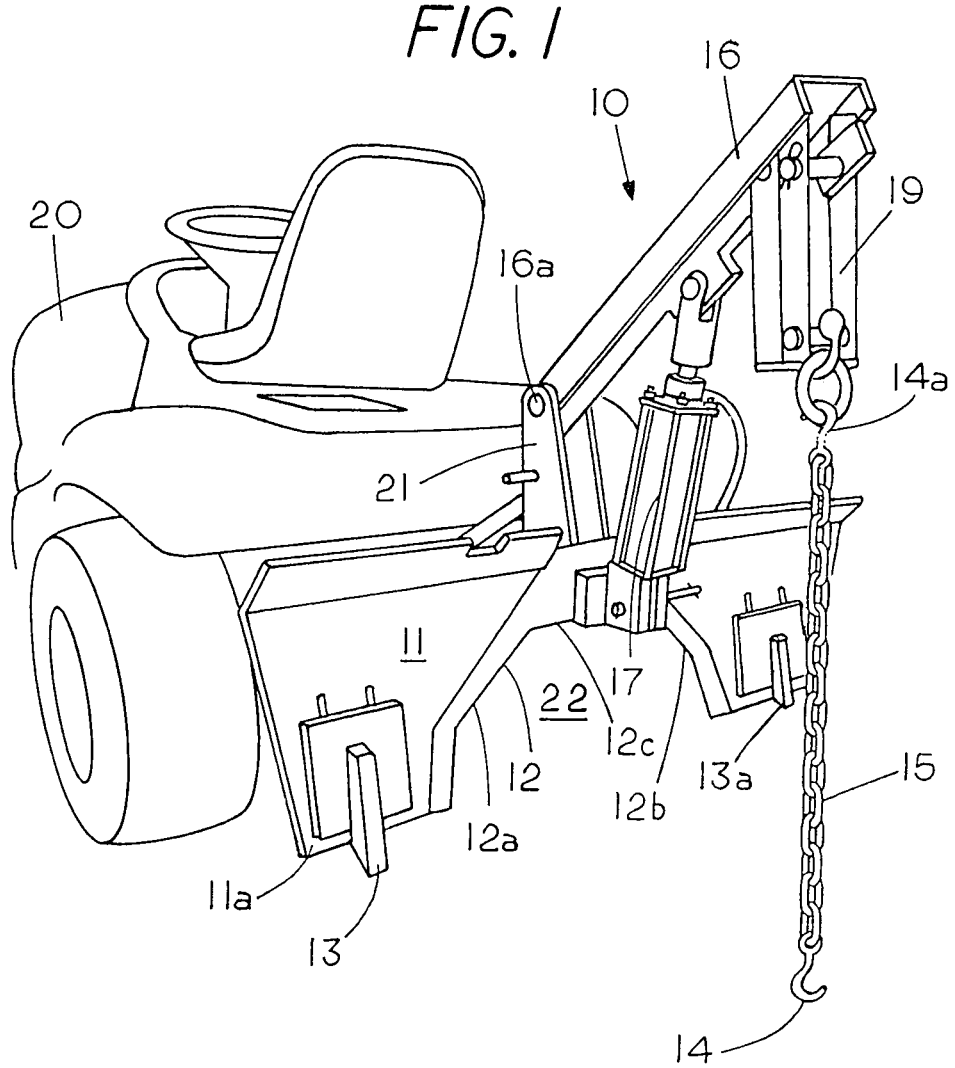
FIG. 1 is a perspective view of a field sawbuck mounted on the rear of a lawn tractor.

FIG. 1 is a perspective view showing a lawn tractor 20 having a field sawbuck 10 mounted on the rear supports of the tractor 20 to enable an operator to cantileverly support a felled tree in a cutting condition. Typically, the field sawbuck 10 may be mounted to a tractor three-point hitch although other types of tractor mounts may be used. As described herein the cantilever support of a felled tree on field sawbuck 10 enables an operator to more easily and quickly delimb a tree as well as to quickly cut the felled tree into shorter lengths. Although a lawn tractor is shown other types of tractors including agricultural and non-agricultural tractors may be used to support field sawbuck 10 without departing from the spirit and scope of the invention. It should be understood that the field sawbuck 10 includes a versatility and standalone ability that permits the field sawbuck to also be mounted on static devices or other mobile devices including front-end loaders, skid steer, truck and the like since the field sawbuck can function independently of its support.

FIG. 1 shows field sawbuck 10 includes an elongated housing member 11 extending horizontally with a lower edge 11a of the housing member 11 having a having a central cutaway region or slot 22 with a set of open fixed jaws 12a and 12b secured to housing member 11 with the jaws 12a and 12b and framing the slot 22 to form a concave tree trunk gripper 12 that can be positioned around an end of a felled tree. A portion of jaws 12a and 12b converge toward one another to guide a tree trunk toward a jaw apex 12c, which is located between jaws 12a and 12b, to enable jaw apex 12c to become a fulcrum for pivoting a felled tree thereon. In the example shown a portion of the jaws 12a and 12b converge to allow one to centrally position or align the trunk of the felled tree with respect to the housing member 11. Jaws 12a and 12b may contain teeth to engage or bite into the tree trunk to inhibit or prevent rotation of the felled tree during a limb trimming operation as well as to limit axial displacement of the end of the tree trunk which is located in the jaws 12a and 12b of tree gripper 12.

In some applications a set of torque stabilising feet may be used to limit side to side tipping of the housing member 11 from tree rotational forces generated by the tree limbs while the tree is cantileverly supported in the housing member 11. The stabilizing feet shown in FIG. 1 comprise a first T shaped footpad 13, which is located at one end of housing member 11, and a second T shaped footpad 13a, which is located at the opposite end of housing member. Footpads 13 and 13a may be vertically adjustable through locking supports (not shown) to accommodate uneven ground support below housing member 11. In operation the footpads 13 and 13a engage the ground a spaced lateral distance from the tree trunk located in the jaws 12 and 12b to provide torsional support for housing member 11 thus stabilizing the housing member 11 from rotational forces due to any rotational forces applied to the housing member 11 by the felled tree which is cantileverly supported in jaws 12a and 12b. In addition the footpads 13 and 13a may also be used to provide torsional resistance to counter balance the upward forces on the front end of the tractor when a felled tree is cantileverly mounted in field sawbuck 10. This is particularly beneficial when the tractor used to support the housing is light weight in relation to the felled tree since it brings the ground fulcrum support for the field sawbuck rearward from the rear tractor axle to the housing member 11a thus lessening forces on the tractor which may cause the front end of the tractor to raise off the ground.

Attached to top of housing member 11 is an extension 21 having an elevating arm 16 that pivots about pivot pin 16a as a pressure cylinder 17 is extended or contracted. Preferably a two-way hydraulic cylinder 17 is used to provide power on both the elevating and the lowering of the elevating arm 16 although a one-way cylinder may be used. Attached to the end of elevating arm through a pivotable linkage 19 is a link chain 15 having a hook member 14 on one end and a hook member 14a on the opposite end. Chain 15 can be extended around the trunk of a felled tree and looped back to provide a tree-lifting cradle around a tree. While a link chain has been shown for forming a tree-lifting cradle other tree engaging members such as a cable or hooks may be used to form a lifting cradle.

Figure 2:
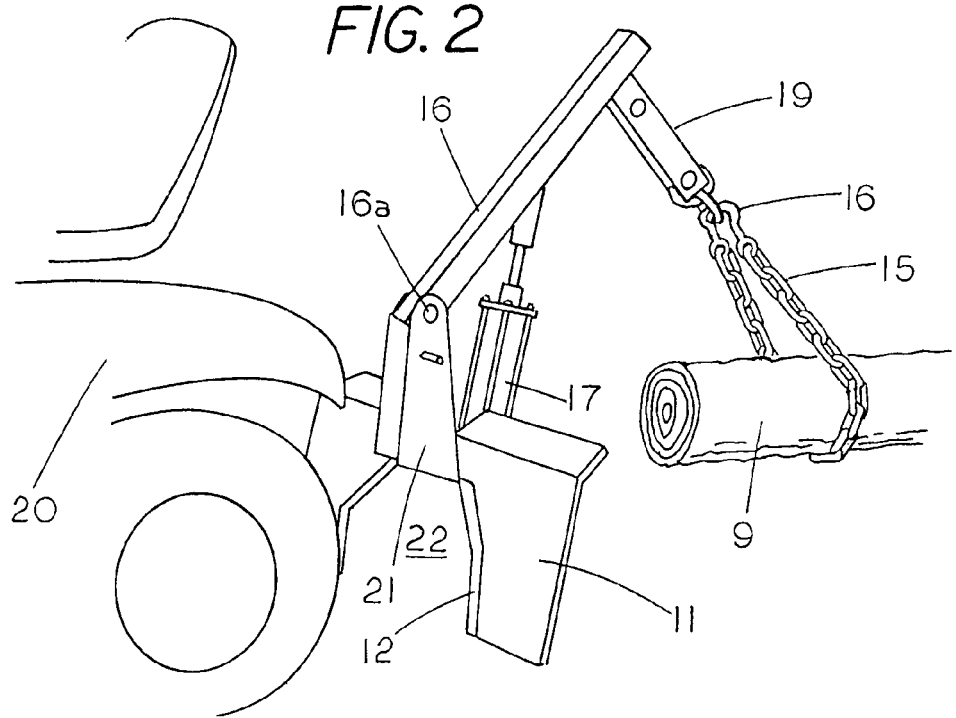
FIG. 2 shows the lawn tractor and field sawbuck of FIG. 1 holding a felled tree proximate the field sawbuck.

FIG. 2 shows the tractor 20 and field sawbuck 10 with a felled tree 9 proximate the recess 22 and the U-shaped tree gripper 12 in housing member 11. To engage the felled tree with the sawbuck the operator may position the sawbuck around the end of the felled tree. An alternate way of bringing the felled tree and the field sawbuck into engagement may include using elevating arm 16. If desired, a winch may be secured to the elevating arm 16 to enable a felled tree to be dragged toward the field sawbuck. Alternately, the tractor 20 may be backed to the felled tree 9 before extending chain 15 around the felled tree 9. In this example the hydraulic power of the tractor 20 may be used to bring felled tree 9 into a cutting position on field sawbuck 10 through the hydraulic cylinder 17. Another option is to back the tractor to the felled tree before engaging the end of the felled tree with the field sawbuck.

Figure 3:
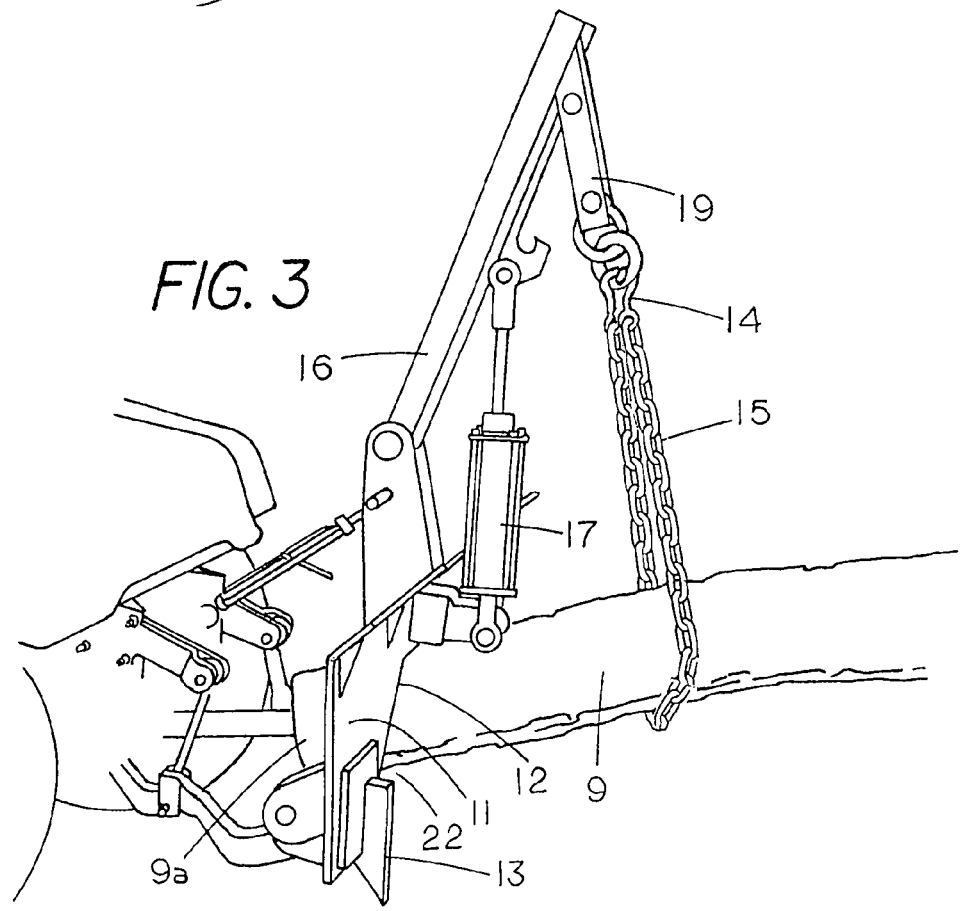
FIG. 3 shows the lawn tractor and field sawbuck of FIG. 1 with a trunk end of the felled tree entering a housing member in the field sawbuck.

FIGS. 3-5 show tractor 20 and field sawbuck 10 with the trunk end 9a of felled tree 9 partially extending into the open recess in housing member 11 proximate the U-shaped tree gripper 12 in housing member 11. In the condition shown the trunk end 9a of felled tree 9 has been axially positioned in the central recess 22 until the trunk end 9a of the felled tree 9 extends through the recess 22 in housing member 11 and below the jaw apex 12c, which forms a tree fulcrum. Extending the tree trunk partially through the recess 22 in housing 11 decreases the torque generated by a felled tree cantileverly mounted therein by bringing some of the weight of the tree to the front of the housing 11. With the trunk end 9a extending through the recess 22 and below the tree fulcrum formed by jaw apex 12c one may raise the elevating arm 16 by supplying power to hydraulic cylinder 17, which pivots the tree 9 about the jaw apex fulcrum 12c to bring the felled tree 9 into the elevated condition shown in FIG. 5. Typically, hydraulic power from the tractor may be used although other sources of power may be used to pivot the felled tree about the top fulcrum formed by jaw apex 12c.

FIG. 4 shows the tractor 20 and field sawbuck 10 with the end 9a of felled tree 9 extending through the open recess proximate the U-shaped tree gripper 12 in housing member 11 with one of the lower housing supports of the three-point hitch removed for clarity. With the felled tree 9 in the condition shown the jaw apex 12c forms a top fulcrum tree gripper which is in position to engage the top portion of the trunk of the felled tree 9 so that one can cantileverly support the felled tree 9 in a cutting condition. That is, an upward movement of felled tree 9 by elevating arm 16 through extension of ram 17a on hydraulic cylinder 17 creates a torque on felled tree 9 since the tree gripper jaw apex 12c forms a top fulcrum that resists upward movement of the end 9a of felled tree 9. Consequently the upward force on felled tree 9 by the tree engaging member or chain 15, which is axially spaced from the housing member 11, causes felled tree 9 to pivot counterclockwise about the tree gripper top fulcrum 12c. That is, the torque generated by pivoting elevating arm 16 in a counter clockwise direction pivots the felled tree 9 about fulcrum 12c so that the felled tree 9 rearward of the housing member 11 is elevated from the ground.

FIG. 5 is a side view that shows the felled tree 9 in an elevated condition in field sawbuck 10 with the torque applied to felled tree 9 through chain 15 and housing member 11 causing the distal end of the felled tree 9 to be elevated off the ground thereby bringing the felled tree with the tree limbs thereon into a suspended or elevated condition. In the elevated condition an operator can readily remove the tree limbs from the tree as well as cut the tree trunk into firewood size chunks by initiating the tree cutting at the distal or free end of the felled tree 9. By supporting the felled tree 9 in a cantilevered position on field sawbuck 10 opportunities for the saw binding are minimized or eliminated since the torque generated by the weight of free end of the felled tree causes the portions of the tree adjacent a saw cut to separate rather than pinch the saw blade. In addition the cutting operation of the felled tree 9 can be done at waist level rather than ground level, which is more comfortable for an operator since it eliminates unnecessary bending and stooping during cutting of the felled tree. Cantilevering the felled tree 9 on the field sawbuck 10 so the trunk of the tree is off the ground also minimizes the chances that the operator's saw blade may accidentally contact foreign objects such as soil, which can rapidly dull the saw. In addition, the need to reposition the felled tree 9 during cutting and trimming is minimized or eliminated since the operator can easily move from one cutting position to another cutting position proximate the felled tree.

In the example shown in FIGS. 1-5 a three-point hitch having links 20a, 20b and 20c connect the field sawbuck 10 to the rear three-point hitch of the tractor 20. Also in this example, the stabilizing feet 13 and 13a have not been used to engage ground 7 as a ground fulcrum as the weight of the tractor in front of the rear axle is used to counter balance the torsional forces exerted on the tractor by the cantilever support of the felled tree. However, with larger felled trees one may use the stabilizing feet 13 and 13A to inhibit rotational forces on the housing member 11 as well as bring the ground fulcrum to a vertical plane through the housing member 11 as opposed to the ground fulcrum below the rear axle of the tractor 20 as shown in FIG. 5.

Figure 6:
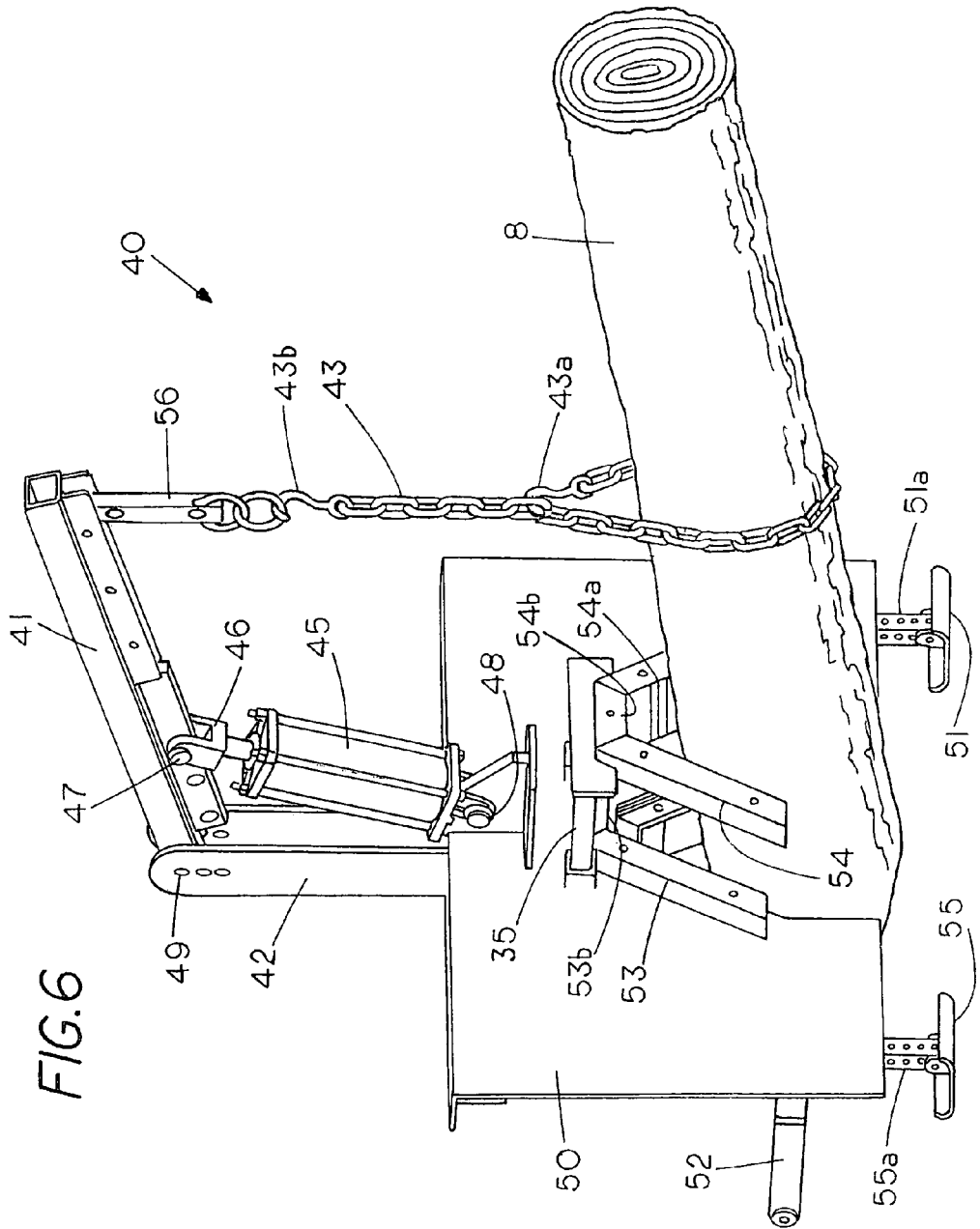
FIG. 6 is a rear view of another example of field sawbuck having a pair of tree grippers for stabilizing a felled tree held therein.

FIG. 6 is a rear view of another example of a field sawbuck 40, which may be independently supported through a set of links 52 located on the front of the field sawbuck 40. In this example housing member 50 contains a U-shaped opening therein with a first U-shaped tree gripper 53 forming a first top fulcrum and a second U-shaped tree gripper 54 forming a second top fulcrum. The purpose of the second tree gripper is to limit lateral and vertical movement of a felled tree 8, which is cantileverly held in housing 50. In this example the top end of the felled tree 8 having been removed.

As shown in FIG. 6 a first tree gripper jaw 53 is located on housing 11 and a second tree gripper jaw 54 extends rearward thereof and is supported by an extendable rail 35 which may be extended by a pressure cylinder, a mechanical linkage (not shown). Alternately, tree gripper 54 may be fixed. Tree gripper jaw 53 and tree gripper jaw 54 may each include a set of teeth for engaging the exterior of the felled tree 9 to inhibit rotation of a felled tree held therein. In this example tree gripper jaw 54 includes a set of teeth 54a located on the interior portion of tree gripper 54. Similarly, tree gripper jaw 53 includes a set of identical teeth (not shown). Tree gripper jaw 53 includes an apex 53b forming a first top fulcrum and tree gripper jaw 54 includes an apex 54b forming a second top fulcrum. In the preferred condition the second top fulcrum may be equal or higher than the first top fulcrum to allow the trunk of the felled tree to be elevated to an acute angle above the horizon.

Field sawbuck 40 includes a first support arm 42 extending upward from housing 50 with an elevating arm 41 pivotally mounted thereto by a pivot pin 49a. A pressure cylinder 45 connects to housing 50 through pivot pin 48 and to elevating arm 41 through a yoke 46 and pivot pin 47. A tree-engaging member comprises a chain 43 with a hook 43a on one the end with the top end of chain secured to a pivotal link 56 through a second hook 43b.

The housing 50 includes torque stabilizing footpad 55 and footpad 51 with the vertical height of footpad 55 manually set through extension of a pin through shaft 55a and a bracket (not shown) on the back of housing 50. Similarly, the vertical height of footpad 51 can be manually set through extension of a pin through shaft 51a and a bracket (not shown) on the back of housing 50. Alternately footpads 55 and 51 can be supported by single or two way pressure cylinders that can be extended to stabilized the housing 50 when a felled tree is being cut into shorter lengths.

Figure 7:
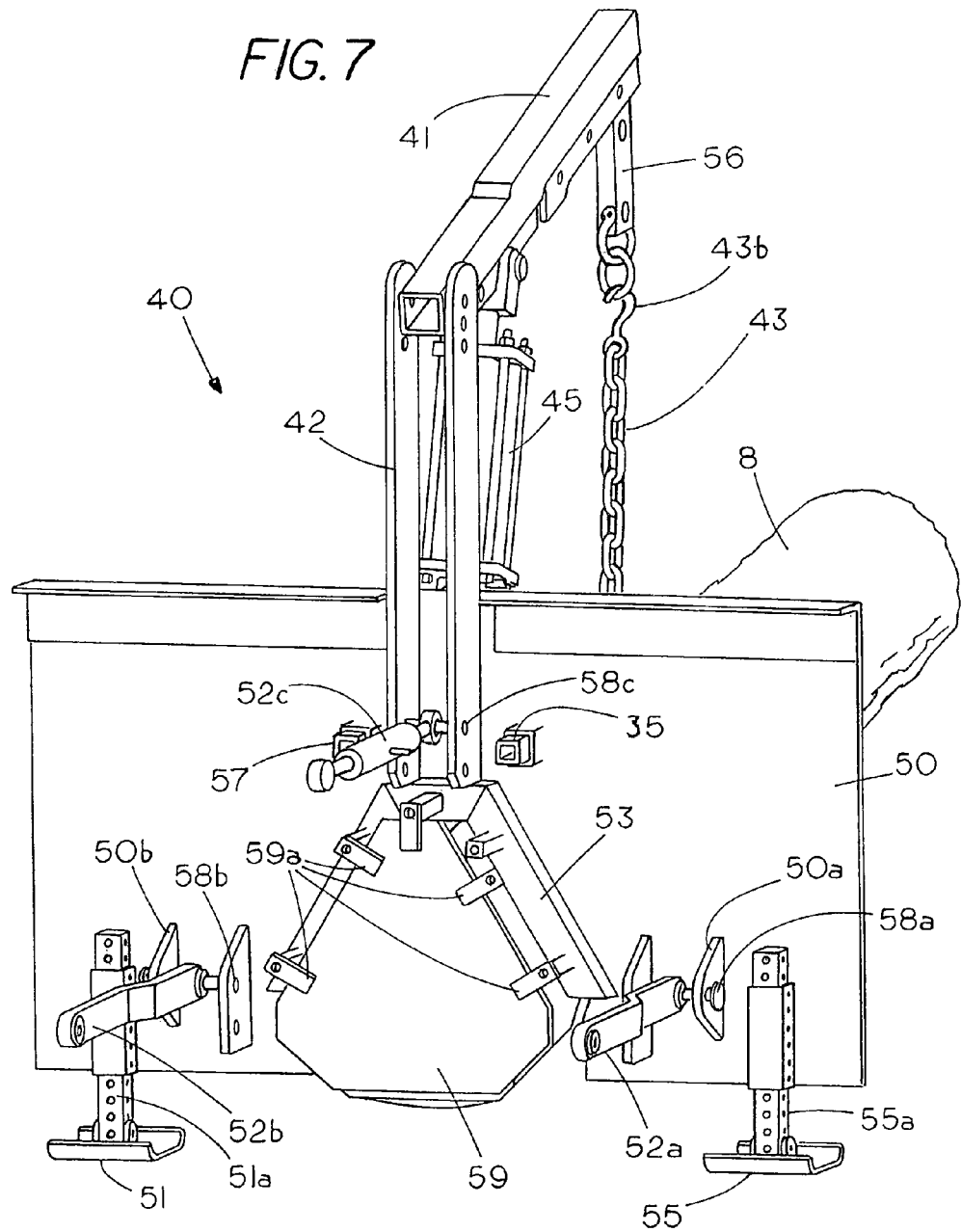
FIG. 7 is a front perspective view of the field sawbuck of FIG. 6.

FIG. 7 is a rear perspective view of housing 50 revealing a stop 59 for limiting penetration of an end of felled tree 8 into housing 50. A set of three links 52a, 52b and 52c provide for attachment of the housing 50 to a field support such as a tractor or the like. Link 52a is pivotally connected to housing bracket 50a by a pivot pin 58a and link 52b is similarly pivotally connected to a housing bracket 50b by a pivot pin 58b. A pivot pin 58c pivotally connects link 52c to extension arm 42. Stop 59 is shown extending laterally rearward from housing 50 and is held in a spaced condition therefrom by a set of right angle bracket 59a. In operation of field sawbuck 40 the stop 59 abuts a cut end of the felled tree to limit the axial penetration of a felled tree through the housing 50 to thereby prevent the felled tree from sliding forward when the felled tree is pivoted into an elevated condition through raising of elevating arm 41.

Figure 8:
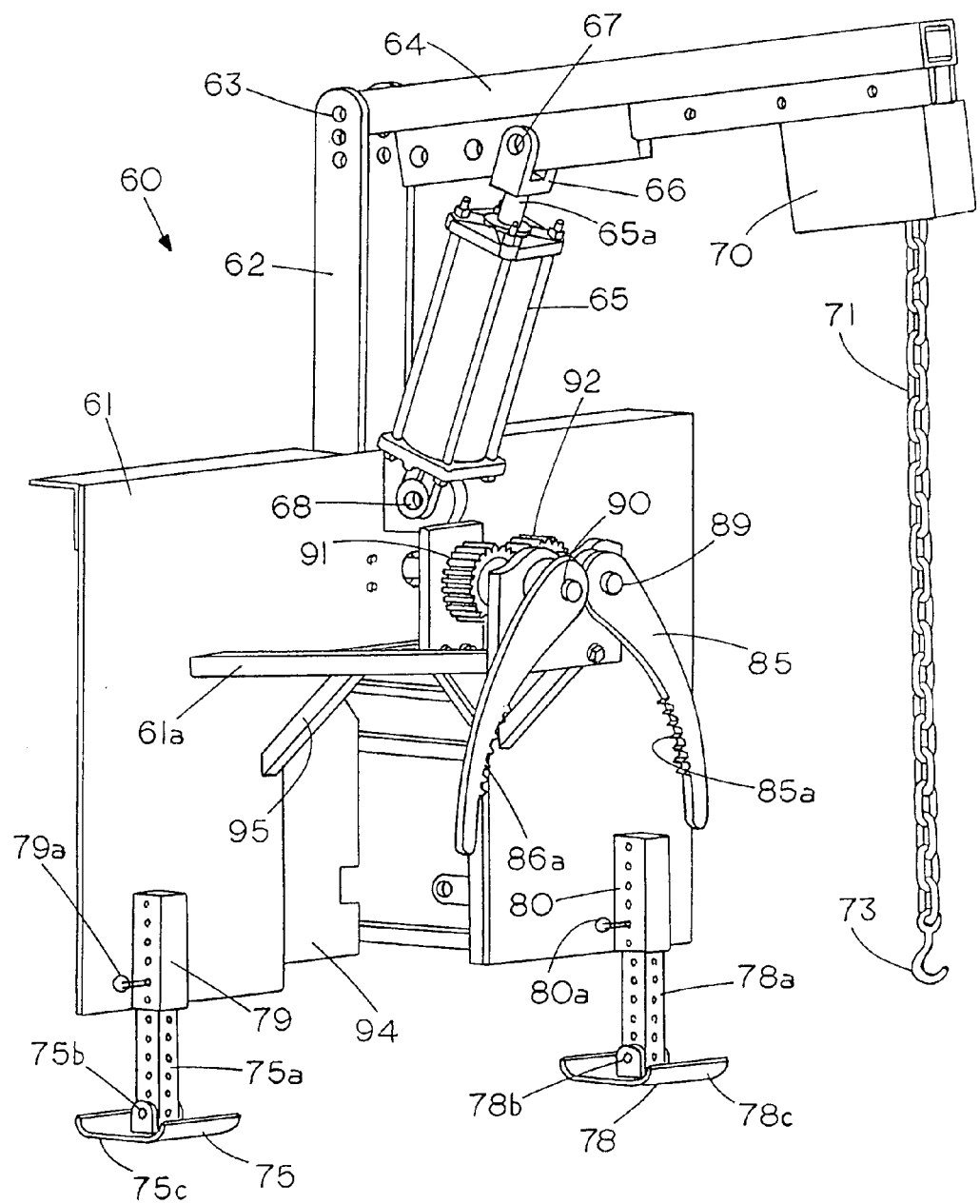
FIG. 8 is a rear perspective view of another example of a field sawbuck having clamps for clampingly engaging a trunk of a felled tree to limit movement of the felled tree therein.
Figure 9:
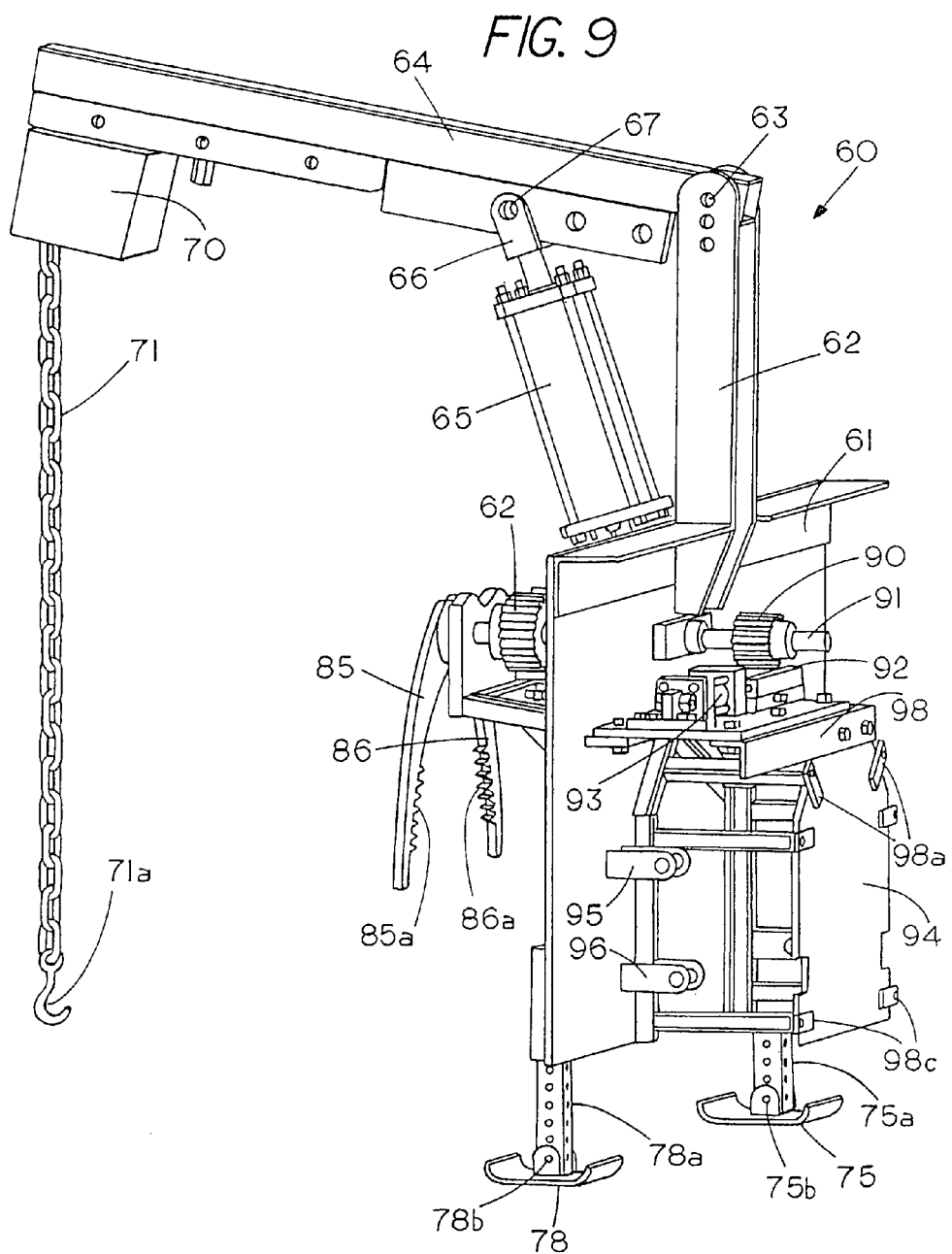
FIG. 9 is a front perspective view of the field sawbuck of FIG. 8.

FIG. 8 and FIG. 9 show another example a field sawbuck 60. In this example field sawbuck 60 includes a housing 61 with an upright arm 62 having an elevating arm 64 pivotally mounted thereto by a pivot pin 63. FIG. 8 shows a front perspective view and FIG. 9 shows a rear perspective view of the field sawbuck 60. A pressure cylinder 65 such as a hydraulic cylinder is pivotally mounted in an extendable and retractable condition through a pivot pin 68 and a yoke 66 on one end and a pivot pin 67 on the opposite end. Pressure cylinder 65 connects to a source of hydraulic controls (not shown) for extending or retracting the ram 65a. Field sawbuck 60 includes a winch 70 and a winch chain or cable 71 with a hook 73 on the distal end. The winch 70, which may be powered manually or from an electrical or hydraulic system provides an additional benefit in that if a tree has been felled in a place where it is difficult to obtain access with the field sawbuck one can use the winch cable to pull the felled tree toward the field sawbuck 60. Once the felled tree is in position the elevating arm, 64 can be raised through cylinder 65 to pivot the felled tree into a cutting position.

An alternative is the use the winch 70 to both pull the felled tree toward the field sawbuck 60 and pivot the tree by continuing to retract the cable when the felled tree is in a cantilevered condition. In this type of application the elevating arm could be fixed and the cylinder 65 may be eliminated.

The field sawbuck 60 shown in FIG. 8 and FIG. 9 includes a first tree gripper jaw 95, which is located in housing 61, and a second tree gripper comprising a first pivotal arm 85 having teeth 85a and a second pivotal arm 86 having teeth 86a for squeezing the trunk of a felled tree therebetween to prevent rotation or movement of the felled tree during the cutting operation. Arm 85 attaches to shaft 89, which is rotationally driven by spur gear 92, and arm 86 is attaches to shaft 90, which is driven by spur gear 91, with both of the spur gears and the pivot arms supported by a bracket 61a that extends outward from housing 61.

FIG. 9 shows a rear view of field sawbuck 60 revealing the tree stop 94 that is supported on the back of housing 61 by a set of right angle brackets 98a. A platform 98 extends outward from housing 61 and includes a rack gear 92, which engages a pinion gear 90 that is mounted to shaft 91. A hydraulic cylinder 93 having an extendible and retractable arm can displace rack 92 to rotate pinion 90 rotates shaft 91 which in turn rotates gears 92 and 91 to either open or close gripper arms 85 and 86.

As shown in the FIG. 8 a first curved tree clamp arm 85 is mounted to shaft 89 and the second tree clamp arm 86 is mounted to a shaft 90 with the shafts rotatable driven by rotation of gears 91 and 92. If desired clamp arm 85 and clamp arm 86 may be clamped around a tree to both elevate the tree as well as to prevent rotation or lateral movement of the tree therein. Clamp arms 85 and 86 are operated by a gear drive although other methods including two way hydraulic cylinders may be used to operate clamp arms 85 and 86. The advantage of having clamp arms independently controllable is that a felled tree can be brought to an elevated condition by pivoting the tree about fulcrum formed by jaw 95. Once pivoted into the cantilevered condition the pivotal jaws can be closed to grasp and hold the felled tree to thereby prevent rotation of the tree as the limbs are removed from the felled tree.

Field sawbuck 60 also includes stabilizing footpads 75 and 78 to permit heavier felled trees to be cantileverly supported without causing the front end of the tractor to raise off the ground during the cantilevering of the tree. The stabilizing foot 78 includes a ground pad 78*c* and the stabling foot 75 also includes a ground pad 75*c* for distributing the force on a wider area. Thus the use of footpads 78*c* and 75*c* in conjunction with legs 78*a* and 75*a* aid in stabilizing the field sawbuck 60 since the footpads assist in counter balancing the torque about housing 61 by a felled tree cantileverly secured therein.

Thus the invention includes the method of positioning a felled tree in a cutting condition on a field sawbuck housing comprising the steps of bringing a cut end of a felled tree into proximity of a field sawbuck housing, confining a cut end of the felled tree in a tree gripper to form a fulcrum and applying a torque to the felled tree through the tree-engaging member to pivot the felled tree about the fulcrum to thereby elevate the felled tree into a cutting condition off the ground. Once the tree is in the cutting condition the operator can cut the limbs off with a chainsaw or the like without concern that the chainsaw blade will contact the supporting soil or that the chainsaw will be pinched during the cutting of the limb. In addition, since the felled tree is held in an elevated condition one eliminates the need to reposition the felled tree in order to remove all the limbs from the felled tree. Once the limbs are removed the operator may wish to move the felled tree ahead to bring the felled tree free of the cut limbs or in the alternative the operator may want to move the felled tree to a location where the firewood from the felled tree is to be stored. The cutting and storing of the firewood can then be completed with a minimum of handling.

While the field sawbuck is shown attached to the lawn tractor one may use the field sawbuck with a variety of motorized or non-motorized vehicles including but not limited to skid steers, trucks, trailers and agricultural tractors as well as non-mobile devices.

Similarly, the field sawbuck may be made in different sizes to fit different size devices and may include hydraulic circuitry to permit operation of two or more functions on the field sawbuck from a single source of hydraulic power. Likewise the field sawbuck may be used as a standalone device.

I claim:

1. A field sawbuck comprising:
    a housing having a front and a rear;
    a fulcrum tree gripper having a first open jaw and a second open jaw located in said housing to form a downward extending tree opening for lateral confinement of a felled tree as the felled tree is lifted upward into the downward extending opening and a downward facing fulcrum jaw extending between the first open jaw and the second open jaw for upward confinement of an end portion of the felled tree therein to form a tree fulcrum for the felled tree when the felled tree is suspended above a ground surface;
    a tree stop attached to a rear of said housing and in alignment with said downward extending opening to enable the tree stop to abut an end face of the felled tree to limit penetration of the felled tree between the first open jaw and the second open jaw;
    an elevating arm pivotally secured to said housing;
    a tree engaging member extendable around a trunk of a felled tree with said tree engaging member secured to said elevating arm with said tree engaging member rearwardly spaced from said housing for grasping the trunk of the felled tree away from the fulcrum of the housing;
    a first torque stabilizer located on a first end of the housing and a second torque stabilizer located on an opposite end of the housing with the torque stabilizer located on opposites sides of the felled tree and in engagement with the ground surface to prevent rotation of the felled tree as the first torque stabilizer and the second torque stabilizer form a housing fulcrum to enable a weight of a motor vehicle attached to the field sawbuck on one side of the housing to compensate for a torque on the opposite side of the housing generated by the cantilever support of the felled tree in the fulcrum jaw of the housing; and
    an activateable link connected to said housing and said elevating arm whereby activating said link elevates the tree engaging member to enable the fulcrum tree gripper to engage a top portion of the felled tree and the tree engaging member to engage a bottom portion of the felled tree cantileverly support the felled tree in a cutting and trimming condition wherein an operator standing on the ground can trim the branches from the felled tree and cut the felled tree into firewood lengths without concern for the felled tree pinching or binding a saw blade.

2. The field sawbuck of claim 1 including a set of fasteners on said housing for securing the housing to a motor vehicle or a field support.

3. The field sawbuck of claim 1 including a further tree gripper with said further tree gripper rearwardly spaced from said fulcrum tree gripper whereby the fulcrum tree gripper and the further tree gripper coact to inhibit or prevent lateral sway of a felled tree therein.

4. The field sawbuck of claim 1 wherein the torque stabilizers comprise vertically positionable feet for stabilizing the sawbuck from tipping from side to side; the activateable link comprises a hydraulic cylinder for raising and lowering the elevating arm and the tree engaging member comprises a chain.

5. The field sawbuck of claim 3 wherein the fulcrum tree gripper and the further tree gripper include teeth for inhibiting or prevent rotation or lateral tree movement during the cantilevering support of a felled tree therein.

6. The field sawbuck of claim 3 including a tree stop where the tree stop is frontally spaced from said housing and in axial alignment with the downward extending opening in the housing.

7. The field sawbuck of claim 1 wherein the elevating arm includes a winch for pulling a felled tree into engagement with the housing member.

8. The field sawbuck of claim 1 wherein the field sawbuck is a standalone device or is mountable to a vehicle trailer hitch, a skid steer mount, a front-end loader or a three-point hitch.

9. A field sawbuck comprising:
a housing having a front and a rear;
a tree gripper located in said housing for confinement of an end portion of a felled tree therein with the tree gripper including a set of downward facing open jaws for laterally and vertically confining an end of the felled tree therein as the felled tree is brought into the open jaws and a downward facing fulcrum jaw for limiting upward displacement of the felled tree when the felled tree is cantilevered therefrom;
a tree engaging member linked to said housing with said tree engaging member rearwardly spaced from said housing;
a member for retracting or extending said tree-engaging member whereby activating the tree-engaging member causes the tree gripper and the tree-engaging member to cantileverly support a felled tree in a cutting and trimming condition.

10. The field sawbuck of claim 9 including a tree stop for limiting penetration of an end portion of the felled tree into said housing wherein the tree stop is located proximate the open jaws to limit axial penetration of the felled tree therein as the felled tree is brought to a cantilevered condition.

11. The field sawbuck of claim 10 including a further tree gripper spaced from the tree gripper with said further tree gripper and said tree gripper each forming a top fulcrum for cooperatively inhibiting sway of a felled tree supported therebetween.

12. The field sawbuck of claim 11 wherein the member comprises a winch for extending and retracting said tree-engaging member.

13. The field sawbuck of claim 12 wherein the member for retracting or extending said tree-engaging member includes an elevating arm and a hydraulic cylinder for pivoting said elevating member.

14. The field sawbuck of claim 12 wherein the further tree gripper comprises clamp arms pivotally mounted and each of the clamp arms includes a set of teeth for inhibiting rotation of a felled tree held therein.

* * * * *